Patented Mar. 26, 1929.

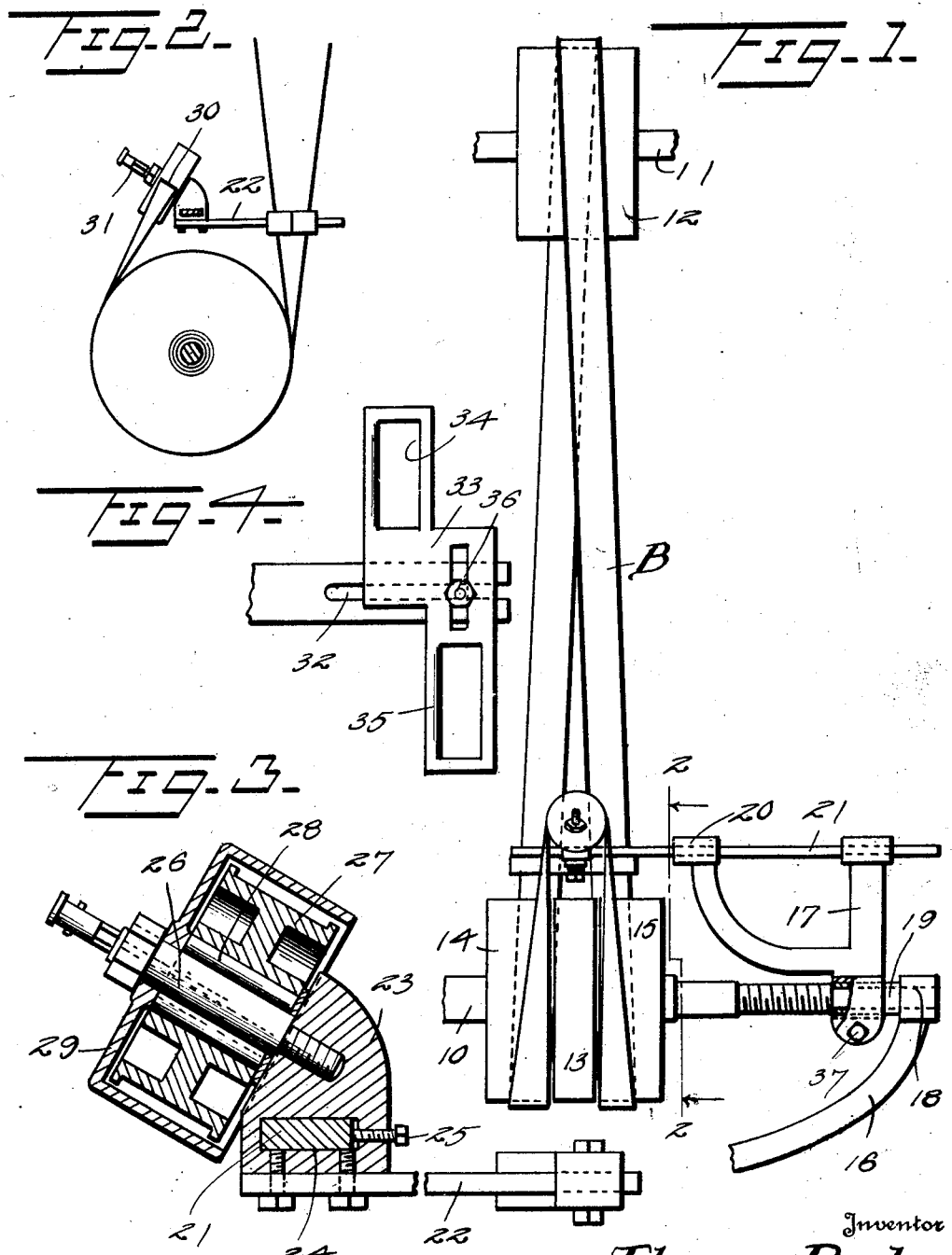

1,706,520

UNITED STATES PATENT OFFICE.

THOMAS BOSKO AND CHARLES WILKINS, OF CANON CITY, COLORADO.

BELT CONTROL.

Application filed January 19, 1928. Serial No. 247,915.

This invention relates to belt controls and more particularly to a control for a single belt adapted to reversely operate the drive pulleys of machinery constituting an improvement on our previous application for patent on belt controls, filed August 16, 1927, Serial No. 213,326. This application is a continuation in part of said application which has been abandoned.

In certain classes of machinery using the ordinary belting controls, two belts are necessary, one of which is crossed, so that a reverse operation is obtained. In many machines with which such a belting arrangement is employed, the crossed belt is dangerous in that the frictional engagement of the oppositely moving runs of the belt with one another produces static electricity, the discharges of which will readily ignite the fumes of gasoline, ether or similar substances causing fires. An important object of the present invention is the elimination of the crossed belt and the production of a construction such that a single belt may be employed to provide the opposite drives with a minimum friction which would produce static electricity.

A further object of the invention is the production of a device of this character which is so mounted that adjustment of the belt to tighten or loosen the same is rendered a very simple operation which may, if desired, be accomplished while the machine is in operation.

These and other objects we attain by the construction shown in the accompanying drawings, wherein for the purpose of illustration is shown a preferred embodiment of our invention and wherein:—

Figure 1 is a side elevation showing a belting control constructed in accordance with our invention;

Figure 2 is a section on the line 2—2 of Figure 1;

Figure 3 is a vertical sectional view through the idler pulley of the belt control and its mounting;

Figure 4 is a plan view of the guides of the belt control.

Referring now more particularly to the drawings, the numeral 10 generally designates a shaft to be oppositely driven, such as the shaft of washing or wringing apparatus of a lundry or the like, while 11 designates a counter shaft from which the shaft 10 is to be driven. Upon the counter shaft is arranged a drive pulley 12 and upon the shaft 10 are arranged a centrally fixed pulley 13 and outer idler pulleys 14 and 15. A support 16 is provided upon which is mounted a bracket 17, which may oscillate upon the approximate axis of the shaft 10 as a center. In the present instance, carrying out the illustration of a laundry machine, this support 16 provides an outer bearing 18 for the shaft 10 and a sleeve-like extension 19 surrounding the shaft upon which the bracket 17 is mounted. The bracket 17 affords spaced eyes 20 through which a bar 21 is longitudinally adjustable in parallelism to the axis of the shaft. The parts just described all form normal parts of certain well known types of laundry machines and form no portion of our invention except in combination with the mechanism now to be described.

In accordance with our invention, we mount upon the bar 21 a transversely extending arm 22. In the present instance, the arm 22 is disclosed as having a block 23 at one end having an opening 24 through which the bar 21 is directed and in which the bar 21 may be held in adjusted positions by a set-screw 25. This block 23 forms a mounting for the pivot 26 of a pulley 27, which is arranged at such an angle, preferably an angle of 60°, that it is substantially tangential to the surfaces of the pulleys 13, 14 and 15. The pulley 27 is preferably provided with roller bearings 28 and mounted within a case 29 slotted at 30 for the passage of the runs of the belt. Suitable means, as indicated at 31, may be provided for lubrication of the pulley. The opposite end of the arm 22 is longitudinally slotted, as at 32, and has mounted thereon a guide fitting 33 having openings 34 and 35 for the passage of the runs of the belt. The fitting 33 is held in adjusted positions by a clamping bolt, designated at 36.

In the use of the apparatus, a single belt is passed about the pulley 12. The runs of this belt are passed about the pulleys 14 and 15 from the same side and then about the pulley 27. Prior to the passage about the pulleys 14 and 15, these runs are directed through the openings 34 and 35 of the guide element 33. It will be obvious that the runs of the belt engaging the pulleys 14 and 15 will be oppositely moving and accordingly these pulleys will be oppositely rotated. If, therefore, it is desired to drive the pulley 13 in a given direction, it is merely necessary to shift the bar 21 longitudinally to cause the selected run to engage the pulley 13. In event in service the belt B becomes loose, the slack may be removed by simply loosening the securing element 37, holding the bracket 17 in position upon the extension 19 of the support and rotating this bracket upon the extension 19 and toward the runs of the belt B between the pulley 12 and a pulley group 13, 14 and 15. After the adjustment is completed, the securing element 37 is again tightened and it may be necessary that some adjustment be made of the guide element 33 which may be accomplished by simply loosening the bolt 36 and sliding this guide element to a point where frictional contact between the runs of the belt and the guide element is avoided. If the belt is too tight, it may be slackened by a reversal of this operation. If a lacing of the belt pulls or becomes loosened, the belt may be slackened and the lacing tightened or replaced without the necessity of removing the belt. It will be obvious that in all rotatably adjusted positions of the bracket 17, the pulley 27 will remain substantially tangential to the pulley group 13, 14 and 15.

From the foregoing, it will be seen that in addition to doing away with the crossed belts, we have provided a construction whereby the repairs ordinarily requiring a considerable loss of time in the operation of the machine may be accomplished in many instances without stopping the machine and in other instances in a much shorter period. It will furthermore be obvious that the construction employed is capable of a certain range of change and modification without materially departing from the spirit of the invention and we accordingly do not limit ourselves to such specific structure except as hereinafter claimed.

We claim:—

1. In a belting control, a shaft having a pulley, a second shaft having a pulley group including loose and fixed pulleys, a belt passed about the pulley of the first shaft and having the runs thereof engaged with pulleys of the second shaft at corresponding sides thereof, a member rotatably adjustable about an axis coincident with the axis of the central shaft, a rod carried thereby paralleling the second shaft and adjustable longitudinally in the member, a pulley carried by the rod and substantially tangential to the pulleys of the second shaft and about which said belt is passed, and a guide likewise carried by said rod adapted for passage of the runs of the belt between the pulleys of the first and second shafts and adjustable toward and away from said pulley.

2. In a belting control, a shaft having a pulley, a second shaft having a pulley group including loose and fixed pulleys, a belt passed about the pulley of the first shaft and having the runs thereof engaged with pulleys of the second shaft at corresponding sides thereof, a member shiftable longitudinally and paralleling the second shaft, a pulley carried thereby and substantially tangential to the peripheries of the pulleys of the second shaft and about which said belt is passed, a mounting for said member whereby the member may be circumferentially adjusted with relation to the second shaft, and a guide likewise carried by said member and adapted for the passage of the runs of the belt between the pulleys of the first and second shafts, said guide being adjustable toward and away from the pulley of the member.

3. In a belting control, a shaft having a pulley, a second shaft having a pulley group including loose and fixed pulleys, a belt passed about the pulley of the first shaft and having the runs thereof engaged with pulleys of the second shaft at corresponding sides thereof, a member rotatably adjustable about an axis coincident with the axis of the central shaft, a rod carried thereby paralleling the second shaft and adjustable longitudinally in the member, a transverse arm carried by and securable in longitudinally adjusted positions upon the rod, a pulley carried by one end of said arm and about which said belt is passed, the opposite end of the arm being slotted, a guide mounted upon the last named end of the arm having openings for the passage of the belt between the pulleys of the first and second shaft and a securing element for said guide extending through the slot of the arm.

In testimony whereof we hereunto affix our signatures.

THOMAS BOSKO.
CHARLES WILKINS.